United States Patent
Cower (10) Patent No.: US 12,177,455 B2
(45) Date of Patent: Dec. 24, 2024

(54) FACE-BASED FRAME PACKING FOR VIDEO CALLS

(71) Applicant: Google LLC, Mountain View, CA (US)

(72) Inventor: Dillon Cower, Woodinville, WA (US)

(73) Assignee: Google LLC, Mountain View, CA (US)

( * ) Notice: Subject to any disclaimer, the term of this patent is extended or adjusted under 35 U.S.C. 154(b) by 255 days.

(21) Appl. No.: 17/632,455

(22) PCT Filed: Oct. 31, 2019

(86) PCT No.: PCT/US2019/059200
§ 371 (c)(1),
(2) Date: Feb. 2, 2022

(87) PCT Pub. No.: WO2021/034338
PCT Pub. Date: Feb. 25, 2021

(65) Prior Publication Data
US 2022/0279191 A1   Sep. 1, 2022

Related U.S. Application Data (60) Provisional application No. 62/888,414, filed on Aug. 16, 2019.

(51) Int. Cl.
*H04N 11/02* (2006.01)
*G06K 9/00* (2022.01)
(Continued)

(52) U.S. Cl.
CPC .......... *H04N 19/167* (2014.11); *G06V 20/41* (2022.01); *G06V 20/46* (2022.01); *G06V 40/16* (2022.01);
(Continued)

(58) Field of Classification Search
CPC ... H04N 21/234345; H04N 21/234363; H04N 21/23418; H04N 19/132; H04N 19/176;
(Continued)

(56) References Cited

U.S. PATENT DOCUMENTS 8,515,398 B2 * 8/2013 Song ................. H04M 1/27475
715/716
9,502,073 B2 * 11/2016 Boiman ............... G11B 27/329
(Continued)

FOREIGN PATENT DOCUMENTS

| | | |
|---|---|---|
| CN | 103905821 | 7/2014 |
| CN | 106131670 | 11/2016 |

(Continued)

OTHER PUBLICATIONS

EPO, Communication Under Rule 71(3) EPC for European Patent Application No. 19809261.1, Jun. 15, 2022, 6 pages.
(Continued)

*Primary Examiner* — Philip P. Dang
(74) *Attorney, Agent, or Firm* — IP Spring (57) ABSTRACT

Implementations described herein relate to methods, systems, and computer-readable media to encode a video. A method includes capturing a video frame that includes a face of a person. The method further includes detecting a face in the video frame. The method further includes segmenting the video frame into a plurality of rectangles, the plurality of rectangles including a face rectangle with pixels corresponding to the face in the video frame. The method further includes packing the video frame based on the plurality of rectangles, wherein a greater number of pixels are allocated to the face rectangle as compared to other rectangles in the plurality of rectangles. The method further includes encoding the video frame with metadata describing the packing.

20 Claims, 5 Drawing Sheets

(51) Int. Cl.
| | |
|---|---|
| *G06K 9/62* | (2022.01) |
| *G06V 20/40* | (2022.01) |
| *G06V 40/16* | (2022.01) |
| *H04N 7/14* | (2006.01) |
| *H04N 19/119* | (2014.01) |
| *H04N 19/137* | (2014.01) |
| *H04N 19/167* | (2014.01) |
| *H04N 19/172* | (2014.01) |

(52) U.S. Cl.
CPC .......... *H04N 7/147* (2013.01); *H04N 19/119* (2014.11); *H04N 19/137* (2014.11); *H04N 19/172* (2014.11); *G06V 2201/10* (2022.01)

(58) Field of Classification Search
CPC .. H04N 19/167; H04N 19/137; H04N 19/172; H04N 7/147; H04N 19/119; G06V 20/41; G06V 20/46; G06V 40/16; G06V 2201/10
See application file for complete search history.

(56) References Cited

U.S. PATENT DOCUMENTS

| | | | |
|---|---|---|---|
| 9,554,111 B2* | 1/2017 | Rav-Acha | H04N 9/87 |
| 9,736,454 B2* | 8/2017 | Hannuksela | H04N 19/597 |
| 10,140,517 B2* | 11/2018 | Babenko | G06V 20/46 |
| 10,244,257 B2* | 3/2019 | Hannuksela | H04N 19/70 |
| 10,835,167 B2* | 11/2020 | Voss | A61B 5/163 |
| 10,863,182 B2* | 12/2020 | Hannuksela | H04N 13/15 |
| 10,939,120 B1* | 3/2021 | Siminoff | H04N 19/146 |
| 11,323,723 B2* | 5/2022 | Hannuksela | H04N 21/85406 |
| 2004/0158719 A1 | 8/2004 | Lee et al. | |
| 2006/0104487 A1 | 5/2006 | Porter et al. | |
| 2015/0034643 A1 | 2/2015 | Wiening | |
| 2015/0264404 A1 | 9/2015 | Hannuksela | |
| 2017/0148109 A1* | 5/2017 | Leow | G06F 16/29 |
| 2017/0337711 A1 | 11/2017 | Ratner et al. | |
| 2017/0371524 A1* | 12/2017 | Fujita | G06F 3/04845 |
| 2017/0374385 A1 | 12/2017 | Huang et al. | |
| 2019/0199995 A1* | 6/2019 | Yip | H04N 13/161 |
| 2019/0220952 A1 | 7/2019 | Lee et al. | |
| 2019/0268599 A1* | 8/2019 | Hannuksela | G03B 37/00 |
| 2020/0336884 A1* | 10/2020 | Casas | H04W 4/022 |

FOREIGN PATENT DOCUMENTS

| | | |
|---|---|---|
| CN | 109063626 | 12/2018 |
| EP | 3481067 | 5/2019 |
| JP | 2003-346145 | 12/2003 |
| JP | 2006-197505 | 7/2006 |
| JP | 2013-031038 | 2/2013 |
| WO | 2019/094184 | 5/2019 |

OTHER PUBLICATIONS

IPO, First Examination Report for Indian Patent Application No. 202247013220, Jul. 19, 2022, 7 pages.
Chen, et al., "A new algorithm for compressing massive region-of-interest location information in videos", 2013 IEEE International Conference on Multimedia and Expo Workshops (ICMEW). IEEE, 2013, 6 pages.
CNIPA, First Office Action (with English translation) for Chinese Patent Application No. 201980101670.3, Jan. 28, 2023, 25 pages.
JPO, Notice of Reasons for Refusal (with English translation) for Japanese Patent Application No. 2022-509165, Mar. 1, 2023, 18 pages.
CNIPA, Second Office Action for Chinese Patent Application No. 201980101670.3, Aug. 28, 2023, 4 pages.
Jpo, Notice of Allowance for Japanese Patent Application No. 2022-509165, Aug. 29, 2023, 6 pages.
EPO, Communication Pursuant to Article 94(3) EPC for European Patent Application No. 19809261.1, Dec. 2, 2021, 4 pages.
EPO, Communication Pursuant to Article 94(3) EPC for European Patent Application No. 19809261.1, May 31, 2021, 4 pages.
EPO, International Search Report for International Patent Application No. PCT/US2019/059200, Jan. 14, 2020, 5 pages.
EPO, Written Opinion for International Patent Application No. PCT/US2019/059200, Jan. 14, 2020, 5 pages.
CNIPA, Notice of Proceeding with Registration Formalities and Notice of Granting a Patent Right for Invention (with English translation) for Chinese Patent Application No. 201980101670.3, Jan. 4, 2024, 6 pages.

* cited by examiner

FACE-BASED FRAME PACKING FOR VIDEO CALLS

CROSS REFERENCE TO RELATED APPLICATIONS

This application is the U.S. National Stage filing under 35 U.S.C. § 371 of International Patent Application No. PCT/US2019/059200, filed on Oct. 31, 2019 and titled FACE-BASED FRAME PACKING FOR VIDEO CALLS, which in turn claims priority to U.S. Provisional Patent Application No. 62/888,414, filed Aug. 16, 2019 and titled FACE-BASED FRAME PACKING FOR VIDEO CALLS, which is incorporated herein by reference in its entirety.

BACKGROUND

A large percentage of mobile video calls use the front-facing camera of a smartphone, tablet, or other device as a source of video for the mobile video call. In many situations, mobile devices may have limited network capability (e.g., bandwidth) available for the video call. Further, some mobile devices may have other constraints, such as, limited processing capacity, limited battery power, etc. In these situations, encoding video frames captured by mobile device and transmitting the encoded frames in the video call may be constrained by such factors and may result in transmission of video that has low quality, for example, manifested as blocky video, low resolution video, video with jitter, etc., that provides a low quality video viewing experience for other parties in the video call.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a method for encoding video in a video calling application includes capturing a video frame that includes a face of a person. The method further includes detecting a face in the video frame. The method further includes segmenting the video frame into a plurality of rectangles, the plurality of rectangles including a face rectangle with pixels corresponding to the face in the video frame. The method further includes packing the video frame based on the plurality of rectangles, wherein a greater number of pixels in the packed video frame are allocated to the face rectangle as compared to other rectangles in the plurality of rectangles. The method further includes encoding the packed video frame, where the encoded video frame includes metadata descriptive of the packing.

In some embodiments, the metadata includes a description of a center and a scale of the face rectangle. In some embodiments, the metadata describes a face transform center and a face transform x/y scale. In some embodiments, the method further comprises, after packing for the video frame, adding padding pixels around each of the plurality of rectangles. In some embodiments, packing the video frame includes using the video frame as a source texture. In some embodiments, the plurality of rectangles further includes at least one of a left-of-face rectangle, a right-of-face rectangle, an above-face rectangle, or a below-face rectangle. In some embodiments, the method further comprises transmitting the encoded video frame to a receiver, wherein the metadata is readable by the receiver to perform inverse packing to display the plurality of rectangles in corresponding positions on a display screen, and wherein corresponding positions include at least one of a left-of-face position, a right-of-face position, an above-face position, or a below-face position. In some embodiments, the method further comprises capturing a second video frame through an n−1 video frame and responsive to an amount of movement within each video frame of the second video frame through the n−1 video frame meeting a threshold amount of movement, performing face detection, packing, and encoding for the each video frame of the second video frame through the n−1 video frame. In some embodiments, detecting the face comprises performing red green blue (RGB) face tracking on the video frame.

A non-transitory computer-readable medium may include instructions stored thereon that, when executed by one or more computers, cause the one or more computers to perform operations, the operations comprising: capturing a video frame that includes a face of a person, detecting the face in the video frame, segmenting the video frame into a plurality of rectangles, the plurality of rectangles including a face rectangle with pixels corresponding to the face in the video frame, packing the video frame based on the plurality of rectangles, wherein a greater number of pixels in the packed video frame are allocated to the face rectangle as compared to other rectangles in the plurality of rectangles, and encoding the packed video frame, where the encoded video frame includes metadata descriptive of the packing.

In some embodiments, the metadata includes a description of a center and a scale of the face rectangle. In some embodiments, the metadata describes a face transform center and a face transform x/y scale. The operations may further comprise, after packing for the video frame, adding padding pixels around each of the plurality of rectangles. In some embodiments, the plurality of rectangles further includes at least one of a left-of-face rectangle, a right-of-face rectangle, an above-face rectangle, or a below-face rectangle.

A system may comprise one or more processors; and a memory that stores instructions that, when executed by the one or more processors cause the one or more processors to perform operations comprising: capturing a video frame that includes a face of a person, detecting the face in the video frame, segmenting the video frame into a plurality of rectangles, the plurality of rectangles including a face rectangle with pixels corresponding to the face in the video frame, the plurality of rectangles including the face rectangle, packing the video frame based on the plurality of rectangles, wherein a greater number of pixels in the packed video frame are allocated to the face rectangle as compared to other rectangles in the plurality of rectangles, and encoding the packed video frame, where the encoded video frame includes metadata descriptive of the packing.

In some embodiments, the metadata includes a description of a center and a scale of the face rectangle. In some embodiments, the metadata describes a face transform center and a face transform x/y scale. The operations may further comprise, after packing for the video frame, adding padding pixels around each of the plurality of rectangles. The operations may further comprise after packing for the video frame, adding padding pixels around each of the plurality of rectangles. In some embodiments, the plurality of rectangles further includes at least one of a left-of-face rectangle, a right-of-face rectangle, an above-face rectangle, or a below-face rectangle.

The various embodiments described below have several advantages. First, the processing is performed by the user device that encodes the video. As a result, the video application reduces a size of the video to be transmitted to the receiver device. Second, the video application maintains the quality of the person's face in the video while reducing the resolution of other parts of the video, resulting in a smaller video size.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

To solve the problem of providing high-quality video that is a small enough in size that it can be streamed over a network, techniques are described herein that capture a video frame that includes a face of a person and detect the face in the video frame. In some embodiments a face rectangle is formed that includes pixels corresponding to the face in the video frame. The video frame is segmented into a plurality of rectangles, where the plurality of rectangles include the face rectangle. The video frame is packed based on the plurality of rectangles, where a greater number of pixels of the packed video frame are allocated to the face rectangle as compared to other rectangles in the plurality of rectangles. Allocating more pixels to the face rectangle in this manner has the benefit that a greater portion of the data in the packed video frame corresponds to the face, thereby enabling a higher quality of rendering of the face rectangle by a receiver. The video frame is encoded with metadata describing the packing.

For example, if the face rectangle in the original video frame is of a same size as another rectangle of the plurality of rectangles, the number of pixels allocated to the face rectangle in the packed video frame may be selected to be higher than the number of pixels allocated to the other rectangle. For example, consider a square video frame that has 10,000 pixels, with 100 pixels in each row and 100 rows of pixels. In this example, it is detected that the face rectangle is 50×40 pixels for a total of 2,000 pixels, and the other rectangles are 2,000 pixels each. When the video is resized, e.g., compressed for transmission, to 5,000 pixels, with 50 pixels in each row and 100 rows, per techniques described herein, the face rectangle may be packed at the original size of 2000 pixels, while each of the other rectangles may be resized to 750 pixels to obtain the packed video frame of the size 5,000 pixels. By providing a greater number of pixels for the face rectangle, the quality of the image in the packed video frame for the face rectangle may be higher (e.g., same as that in the original video frame in this example) than the quality of other rectangles.

Because the face rectangle has a greater number of pixels than the other rectangles, the face rectangle is encoded at a higher resolution than the other rectangles. This is advantageous because the face region is more important to ensure that a receiving user is able to see the face at a high quality, thus providing for a positive user experience during a video call. Encoding the face region with a higher resolution than the other regions results in the more positive user experience with lower bandwidth demands because the overall size of the encoded packed video is smaller.

To achieve a similar video experience without separately encoding the face rectangle in this manner would require a higher size video to be transmitted, which can consume a greater amount of processing and bandwidth resources. Further, by specifically recognizing face position in the video and adjusting the face rectangle accordingly, the described techniques automatically adjust when the subject moves and provides a consistent quality of video of the face region. Packing the video frames in the manner described herein enables conventional video encoding techniques to be used for the video call, and provides high quality face regions without any change to underlying encoding mechanisms.

Example Environment

Figure 1:
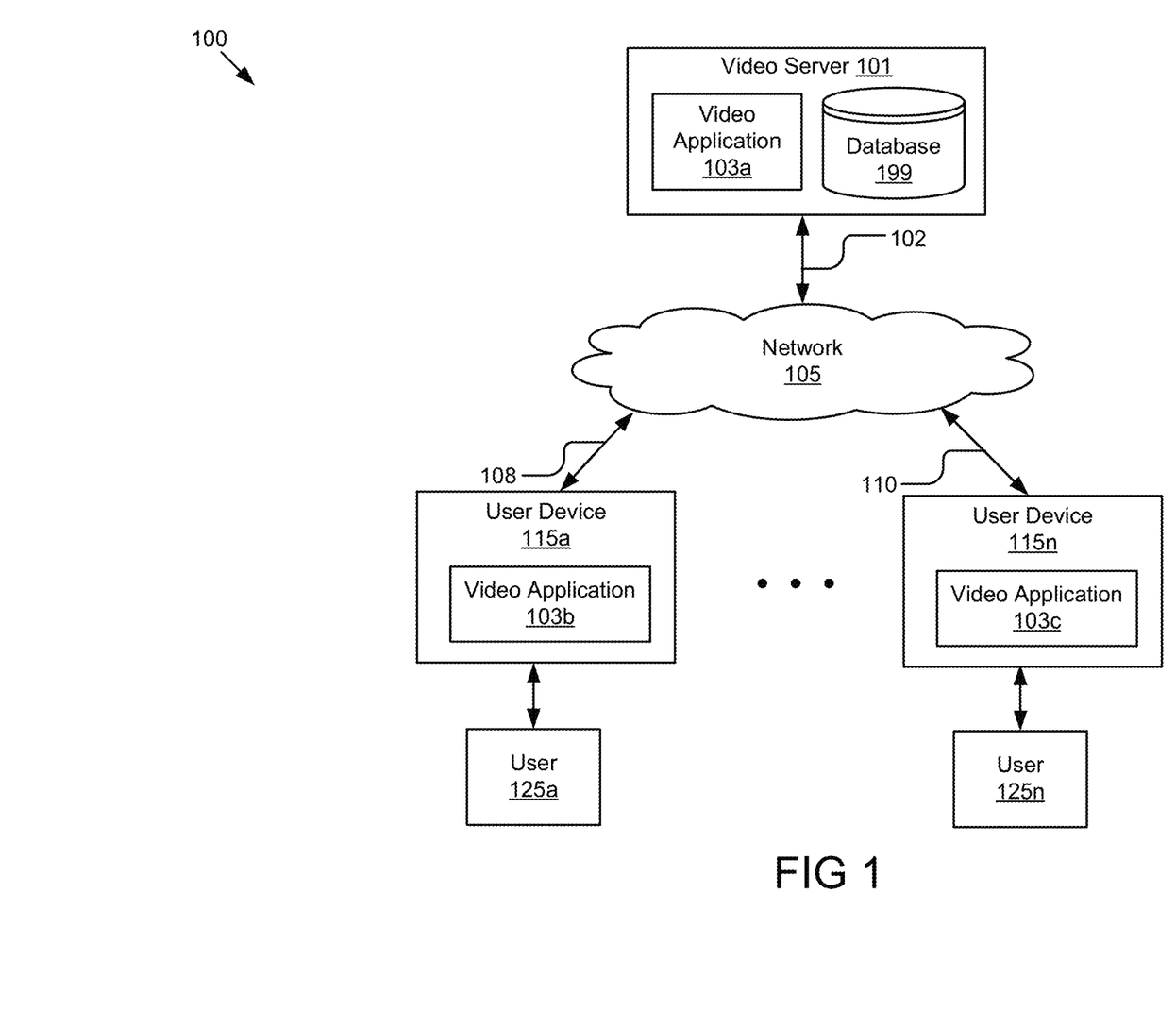
FIG. 1 illustrates a block diagram of an example environment in which video is encoded according to some embodiments.

FIG. 1 illustrates a block diagram of an example environment 100 in which an encoded video is generated. The illustrated environment 100 includes a video server 101, user devices 115a, 115n, and a network 105. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The video server 101 may include a processor, a memory, and network communication hardware. In some embodiments, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the video server 101 sends and receives data to and from one or more of the user devices 115a, 115n via the network 105. The video server 101 may include a video application 103a and a database 199.

The video application 103a may include code and routines operable to generate encoded video at one user device 115a and/or transmit the encoded video to another user device 115n. In some embodiments, the video application 103a may be implemented using hardware including a central processing unit (CPU), a field-programmable gate array (FPGA), an application-specific integrated circuit (ASIC), any other type of processor, or a combination thereof. In some embodiments, the video application 103a may be implemented using a combination of hardware and software.

The database 199 may store video including the encoded video received from user devices 115. Video is stored when the user associated with the client device that generates the video provides permission to store the video. The database

199 may store videos that are indexed and associated with identities of the users 125 of the mobile devices 115. For example, a video may be indexed in association with metadata that describes the user 125 as a member of a social network including a link to a profile of the member of the social network. The database 199 may also store social network data associated with users 125, user preferences for the users 125, etc.

In situations in which the systems and methods discussed herein may collect or use personal information about users (e.g., user data, information about a user's social network, storage and analysis of video by the video application 103, etc.), users are provided with opportunities to control whether personal information is collected, whether the personal information is stored, whether the personal information is used, whether the images or videos are analyzed, and how information about the user is collected, stored, and used. That is, the systems and methods discussed herein may collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the user device 115 can be a wearable device worn by the user 125. For example, the user device 115n is included as part of a clip (e.g., a wristband), part of jewelry, or part of a pair of glasses. In another example, the user device 115n can be a smart watch. The user 125n may view video generated by the video application 103c on a display of the user device 115n worn by the user 125n.

In some embodiments, the user device 115a may include a video application 103b that generates encoded video, e.g., for a video call. The video application 103b may capture a video frame that includes a face of a person, detect a face in the video frame, form a face rectangle that includes pixels corresponding to the face in the video frame, segment the video frame include a plurality of rectangles including the face rectangle, set up a packing for the video frame based on the plurality of rectangles, where a greater number of pixels are allocated to the face rectangle as compared to other rectangles in the plurality of rectangles, and encode the video frame. The video application 103b may repeat this process for additional frames from a series of video frames, e.g., captured by user device 115a during a video call.

The user device 115a may transmit a video stream, e.g., that includes a plurality of encoded video frames, during the video call over network 105 directly to the user device 115n or via the video server 101. The user device 115n may include a video application 103c that decodes the encoded video and displays the decoded video.

In the illustrated implementation, the entities of the environment 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 902.11, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

Example Computing Device

Figure 2:
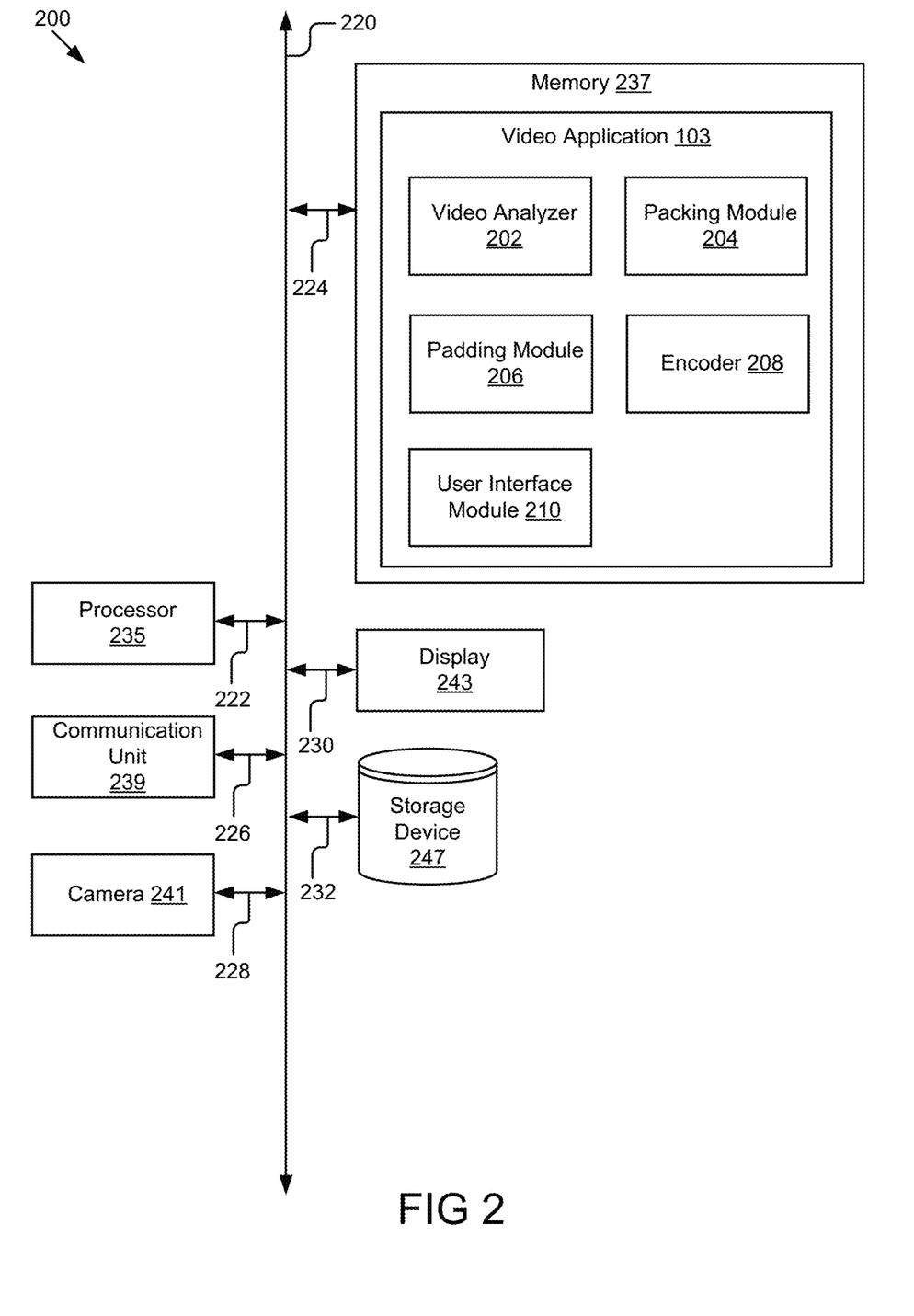
FIG. 2 illustrates a block diagram of an example computing device that encodes video according to some embodiments.

FIG. 2 illustrates a block diagram of an example computing device 200 that generates encoded video. The computing device 200 may be a user device 115 or a video server 101. The computing device 200 may include a processor 235, a memory 237, a communication unit 239, a camera 241, a display 243, and a storage device 247. Additional components may be present or some of the previous components may be omitted depending on the type of computing device 200. A video application 103 may be stored in the memory 237. In some embodiments, the computing device 200 may include other components not listed here, such as a battery, etc. The components of the computing device 200 may be communicatively coupled by a bus 220. Bus 220 may be a communication bus that carries signals between various parts of computing device 200.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 220 for communication with the other components via signal line 222.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The communication unit 239 transmits data to and receives data from at least one of the user devices 115 and the video server 101 depending upon where the video application 103 may be executed. In some embodiments, the communication unit 239 includes a wireless transceiver for exchanging data with the user device 115, video server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and/or a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The camera 241 may include hardware operable to capture video and/or static images. For example, the camera 241 may receive instructions from the user interface module 210 to start capturing video for a video call. The camera 241 may include one or more image sensors, e.g., CMOS sensors, depth sensors (e.g., infrared sensor, time-of-flight sensor, etc.), and/or other types of sensors. In some implementations, camera 241 may include a plurality of lenses or other image capture units. Depth sensors may capture depth data that indicates a depth (distance) from the camera of one or more pixels of a captured image or video. The camera 241 is coupled to the bus 220 for communication with the other components via signal line 228.

The display 243 may include hardware operable to display graphical data received from the video application 103. For example, the display 243 may render graphics to display video frames for a video. Display 243 may be any type of display, e.g., a liquid crystal display (LCD), OLED, etc. In some embodiments, display 243 may be a projected screen.

In some embodiments, e.g., when device 243 is an augmented reality device, display 243 may be a stereoscopic display. The display 243 is coupled to the bus 220 for communication with the other components via signal line 230.

The storage device 247 may be a non-transitory computer-readable storage medium that stores data that provides the functionality described herein. In embodiments where the computing device 200 is the video server 101, the storage device 247 may include the database 199 in FIG. 1. The storage device 247 may be a DRAM device, a SRAM device, flash memory or some other memory device. In some embodiments, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 232.

The video application 103 may include a video analyzer 202, a packing module 204, a padding module 206, an encoder 208, and a user interface module 210.

The video analyzer 202 performs face detection and generates a plurality of shapes from the video frame. In some embodiments, the video analyzer 202 includes a set of instructions executable by the processor 235 perform face detection and generate the plurality of shapes (e.g., rectangles) from the video frame. In some embodiments, the video analyzer 202 is stored in the memory 237 of the computing device 200 and can be accessible and executable by the processor 235.

The video analyzer 202 receives video from the camera 241 and identifies a video frame from the video. For example, a user starts a video call via a user interface generated by the user interface module 210 and the video analyzer 202 records video with a series of video frames to send to another user. The video analyzer 202 identifies a background and a face in the decoded video frame. For example, the video analyzer 202 identifies a first background and a face in the first video frame. In embodiments where the camera 241 includes a depth sensor, depth data may be utilized to identify the background and the face. Other examples of background and face detection are possible, such as the video analyzer 202 identifying multiple faces in the video frame.

In some embodiments, the video analyzer 202 performs motion detection on subsequent frames. The video analyzer 202 may perform face detection on a subsequent video frame in the video based on a threshold amount of movement of the face (or faces) in the video. For example, the camera 241 captures a first video frame and a second video frame through an n−1 video frame. The video analyzer 202 may determine an amount of movement of the face within the second video frame through the n−1 video frame, for example, by comparing the frame with one or more preceding frames. The location of the face may be based on the location as determined by face detection performed on the first frame. If the amount of movement exceeds a threshold amount of movement, the video analyzer 202 performs face detection. The subsequent face detection may be used to determine a more precise location of the face within the subsequent video frames because the face moved as compared to the first video frame. The packing and encoding may also be performed by corresponding modules responsive to the movement exceeding the threshold amount of movement.

In some embodiments, the video analyzer 202 performs face detection on a subsequent video frame in the video based on a predetermined interval. For example, the video analyzer 202 performs face detection on a subsequent video frame once every second. In some embodiments, the video analyzer 202 performs face detection on a subsequent video frame in the video based on a predetermined interval and based on a threshold amount of movement. For example, the video analyzer 202 performs face detection on a subsequent video frame every half second if there is any movement of the face in the video.

The video analyzer 202 may distinguish between the face and the background in a frame by applying a face-tracking technique. For example, the video analyzer 202 may apply a red green blue (RGB) face tracking technique that identifies the location of the face in the video frame and a timestamp for the video frame. In some embodiments, the video analyzer 202 determines a set of landmark vertices. The set of landmark vertices describes the set of landmark vertices in face space. The video analyzer 202 identifies landmarks that are close to edges of the face. For example, the landmark vertices may correspond to landmarks on a face, e.g., facial features such as top of forehead, bottom of chin, left ear, and right ear. Other landmark vertices are possible, such as mouth, nose, chin, eyes, ears, and parts thereof, etc.

In some embodiments, the video analyzer 202 uses machine learning techniques to perform real-time face tracking of one or more video frames. In some embodiments, one or more machine learning models may be trained, e.g., based on training data, for which permission to utilize user data for training have been obtained expressly from users. The training data may include any data, such as videos and corresponding metadata, that is permitted for use for training, such as synthetic or computer-generated data, data licensed for use for training, etc.

In some embodiments, a trained model may be obtained based on supervised learning, for example, based on training data including images and videos and corresponding metadata. For example, a trained model may include model form or structure (e.g., descriptive of a number and organization of a plurality of nodes into layers of a neural network, with associated weights). In some embodiments, the model may be trained to detect and track faces in a video. For example, a video may be provided and data indicative of face position (e.g., facial landmarks) in one or more frames of the video may also be provided as input to an untrained model. The model may be trained (using supervised learning) to predict the location of the face, for example, by providing hundreds of landmarks (e.g., 486) and the center for the face rectangle is identified using minimum and maximum positions for size and mean position as the center for the face rectangle. The model may be utilized to detect facial landmarks in a video and the predicted landmark locations may be compared with groundtruth data. A difference between the two may be computed and provided as training feedback. Weights of one or more neural network nodes or other parameters of the model may be adjusted based on the feedback. Training may be completed when the model predictions of landmark locations meet an accuracy threshold.

In some embodiments, users help create the training data by providing user input. Users may be asked to identify the location of the face within the video frames. As a result of user input, the training data may have accurate identification about the location of the face in the video frame. In this example, and the other examples of identifying the location of the face, face detection does not include determining identity, e.g., no facial recognition is performed. In addition, the training data may be representative of use context, for example, where the use context is detecting faces in video calls conducted using mobile devices.

The video analyzer 202 may generate and/or utilize a trained model that can determine the location of the face in the video frame. In some embodiments, the trained model may be a temporal action localization model. In various embodiments, the video analyzer 202 may use Bayesian classifiers, support vector machines, neural networks, or other machine learning techniques to generate the trained model.

In some embodiments, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the face resampling keyframe and other metadata. For example, the output may be landmark vertices identifying the location of the face in the video frame. In some embodiments, model form or structure also specifies a number and/or type of nodes in each layer.

In different embodiments, a trained model can include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a non-linear function. In various embodiments, such computation may include operations such as matrix multiplication. In some embodiments, computations by the plurality of nodes may be performed in parallel, e.g., using multiple processors cores of a multicore processor, using individual processing units of a general processing unit or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., frames in a video.

In some embodiments, a trained model may include embeddings or weights for individual nodes. For example, a trained model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The trained model may then be trained, e.g., using data, to produce a result.

The video analyzer 202 segments the video frame into a plurality of shapes. For example, the video analyzer 202 generates a plurality of rectangles including a face rectangle. In some embodiments, the plurality of rectangles may include the face rectangle and at least one of a left-of-face rectangle, a right-of-face rectangle, an above-face rectangle, or a below-face rectangle. For example, the video analyzer 202 generates a face rectangle, a left-of-face rectangle, and a right-of-face rectangle. The video analyzer 202 may determine the different types of rectangles based on the portion of the frame that is detected as including the face. For example, if the video frame is almost entirely the user's face, the video analyzer 202 may generate a face rectangle and no other rectangles.

Figure 3A:
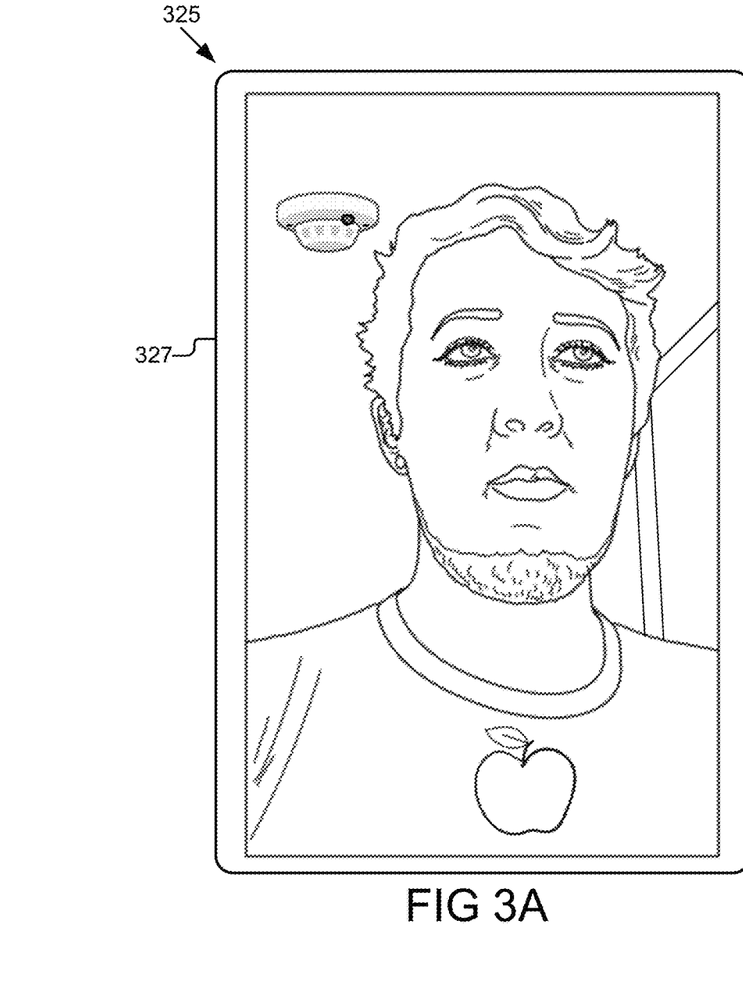
FIG. 3A illustrates an example video frame according to some embodiments.
Figure 3B:
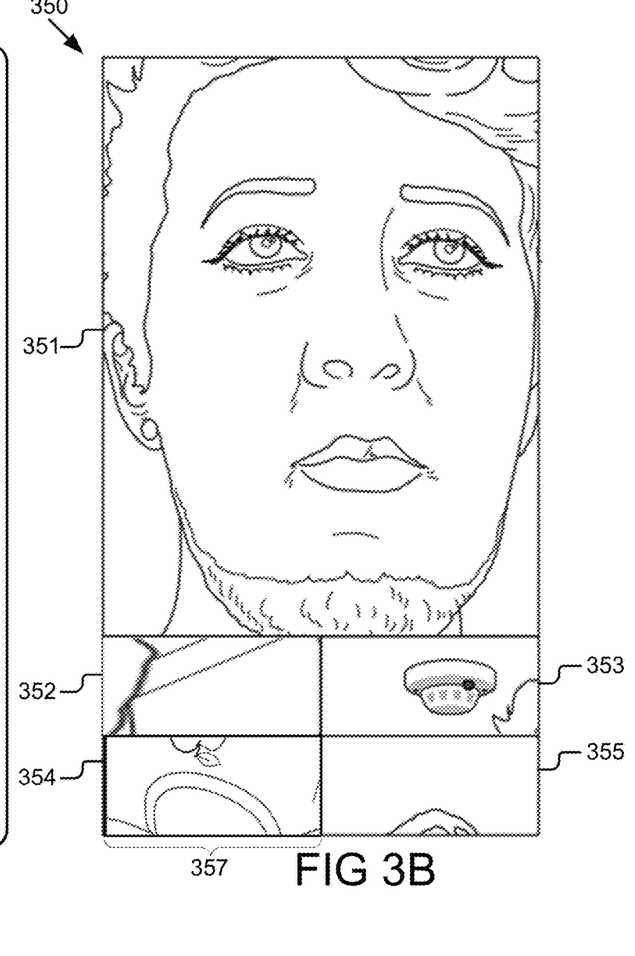
FIG. 3B illustrates an example of a plurality of rectangles according to some embodiments.

The video analyzer 202 determines the dimensions of the face rectangle based on the face detection. The face rectangle includes pixels corresponding to the face in the video frame. Turning to FIG. 3A, an example of a video frame 325 within a display screen 327 is illustrated. Turning to FIG. 3B, an example of a plurality of rectangles 350 is illustrated. In this example, the video analyzer 202 generated a face rectangle 351, a right-of-face rectangle 352, a left-of-face rectangle 353, a below-face rectangle 354, and an above-face rectangle 355. Other shapes are possible, including, for example, polygons with higher or lower number of vertices, e.g., triangles, pentagons, hexagons, etc. In some embodiments, a height of the rectangle is configurable either as determined by the video application 103 or as configured by a user. For example, the face rectangle may take up 75% of the packed video frame by default and the height may be modified by a user via a user interface, which is described in greater detail below with reference to the packing module 204.

The packing module 204 packs video frames. In some embodiments, the packing module 204 includes a set of instructions executable by the processor 235 to pack the video frames. In some embodiments, the packing module 204 is stored in the memory 237 of the computing device 200 and can be accessible and executable by the processor 235.

In some embodiments, the packing module 204 packs the video frame by generating metadata that describes how the video frame is to be encoded based on allocation of the pixels to different regions of the video frame. The packing module 204 packs the video frame based on the plurality of rectangles, where a greater number of pixels are allocated to the face rectangle as compared to other rectangles in the plurality of rectangles. Because the face rectangle has a greater number of pixels than the other rectangles, the face rectangle is encoded at a higher resolution than the other rectangles. Allocating more pixels to the face rectangle in this manner has the benefit that a greater portion of the data in the packed video frame corresponds to the face, thereby enabling a higher quality of rendering of the face rectangle by a receiver.

Figure 3C:
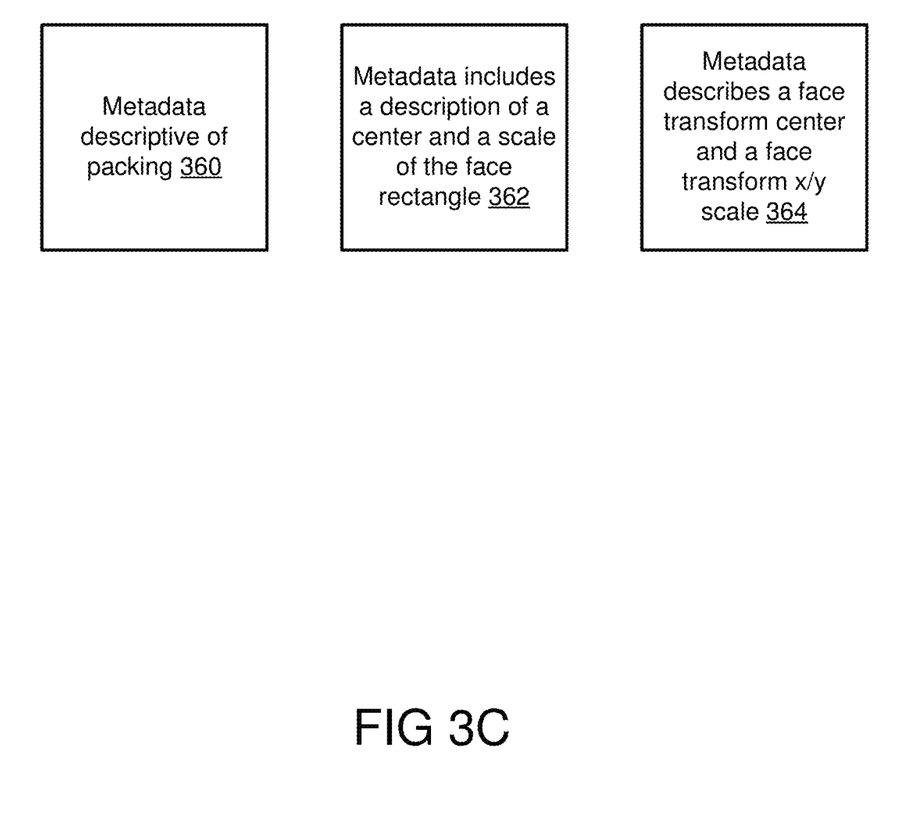
FIG. 3C illustrates examples of metadata according to some embodiments.

The packing module 204 encodes the video frame. The metadata is illustrated in FIG. 3c. The encoded video frame includes metadata 360 describing the packing. The metadata 362 may include a description of a center and a scale of the face rectangle. The metadata 364 may describe a face transform center and a face transform x/y scale. The face transform center is the location of the center (mean position) of the face in the video frame before packing. The face transform x/y scale is the size of the rectangle containing the face in the video frame before packing. The metadata is usable by a receiver device to decode and render the video frame for display. For example, referring to FIG. 3B which illustrates a packed video frame, the metadata indicates that the right-of-face rectangle 352 is the rectangle immediately below the face rectangle 351 and on the left. Further, the metadata also indicates that the below-face rectangle 354 is the rectangle at the bottom left of the packed frame, rotated 180 degrees. During unpacking of the frame, the metadata can be used to rearrange the rectangles at appropriate positions to render the video frame.

In some embodiments, the packing module 204 may pack a first frame and then pack a subsequent frame based on the plurality of rectangles. The subsequent frame is encoded with metadata describing the packing. In some embodiments, the packing module 204 may continue to pack frames in the same configuration (without recomputation of the metadata) as long as movement of the face between frames is below a threshold amount of movement. If movement of the face exceeds a threshold amount of movement, the video analyzer 202 performs face detection and the packing module 204 generates a new packing configuration to pack the subsequent frames. In some embodiments, the threshold amount of movement for performing packing is different from the threshold amount of movement for performing face detection and different frames are packed than have face detection performed on them.

The padding module 206 adds padding pixels around the plurality of shapes as illustrated as 357 in FIG. 3b. In some embodiments, the padding module 206 includes a set of instructions executable by the processor 235 to add padding pixels around the plurality of shapes. In some embodiments, the padding module 206 is stored in the memory 237 of the computing device 200 and can be accessibly and executable by the processor 235.

In some embodiments, the padding module 206 adds padding around the rectangles after the video frame is packed. The padding module 206 may add one to five pixels of padding around each of the rectangles. For example, the padding module 206 may add two pixels of padding around each of the rectangles. The padding module 206 may fill empty space from the surrounding rectangles with edge pixels from surrounding rectangles. The padding is used to avoid motion bleeding across rectangle boundaries and interpolation between the rectangles when the encoder encodes the packed video frame using video codec. The padding avoids these issues by making the borders between the rectangles at least a threshold number of pixels wide such that the encoding process does not introduce errors in the video. Put in another way, a conventional encoder is designed to encode a video frame where neighboring pixels originate from neighboring points in the scene depicted in the video. The packing technique described herein provides an input video to the encoder where neighboring pixels do not correspond to neighboring points in the scene, as illustrated in FIG. 3B. Adding padding around the rectangles eliminates the need to modify the encoder to account for the rearrangement of the plurality of rectangles of the video frame and instead, enables the use of any available conventional encoder. The amount of padding may be selected based on the video codec used, e.g., based on known properties of the encoding when the video codec is used.

The encoder 208 encodes the video frame. In some embodiments, the encoder 208 includes a set of instructions executable by the processor 235 to encode the video frame. In some embodiments, the encoder 208 is stored in the memory 237 of the computing device 200 and can be accessibly and executable by the processor 235.

The encoder 208 encodes the packed video frame, e.g., generates data representative of the video frame based on a particular video codec, e.g., that is used for a video call. In some embodiments, a source texture is an initial video frame that is combined with motion history information to describe how things in the video frame change as a function of time. For example, metadata may describe how a location of the face in the video frame changes in subsequent video frames. More specifically, the metadata may describe where the landmark points are with reference to a previous frame. The encoder 208 may render the packing using the video frame as the source texture. The encoder 208 encodes the video frame and includes the metadata describing the packing. For example, the metadata includes a center and scale of the face. In some embodiments, the metadata is about 16 bytes without optimization and includes (1) a face transform center, which describes the pixel position of the face transform center in the input image, as two 32-bit floats and (2) a face transform x/y scale as two 32-bit floats.

The encoder 208 transmits the encoded video frame to another user device 115 (a receiver device). The receiver device decodes the encoded video frame and, prior to displaying the frame, the receiver device performs inverse packing to render the rectangles to their appropriate positions on the screen. The corresponding portions of the video frame may include at least one of a left-of-face position, a right-of-face position, an above-face position, or a below-face position.

The user interface module 210 generates graphical data to display a user interface. In some embodiments, the user interface module 210 includes a set of instructions executable by the processor 235 to generate the graphical data. In some embodiments, the user interface module 210 is stored in the memory 237 of the computing device 200 and can be accessible and executable by the processor 235.

In some embodiments, the user interface module 210 generate graphical data to display a video call. In some embodiments, the user interface module 210 also generates user interface options associated with the video application 103. For example, the user interface includes options for initiating the video call, adding other users to the video call, changing settings associated with the video call, such as changing the dimensions (e.g., a height) of the face rectangle used for packing, etc.

Example Method

Figure 4:
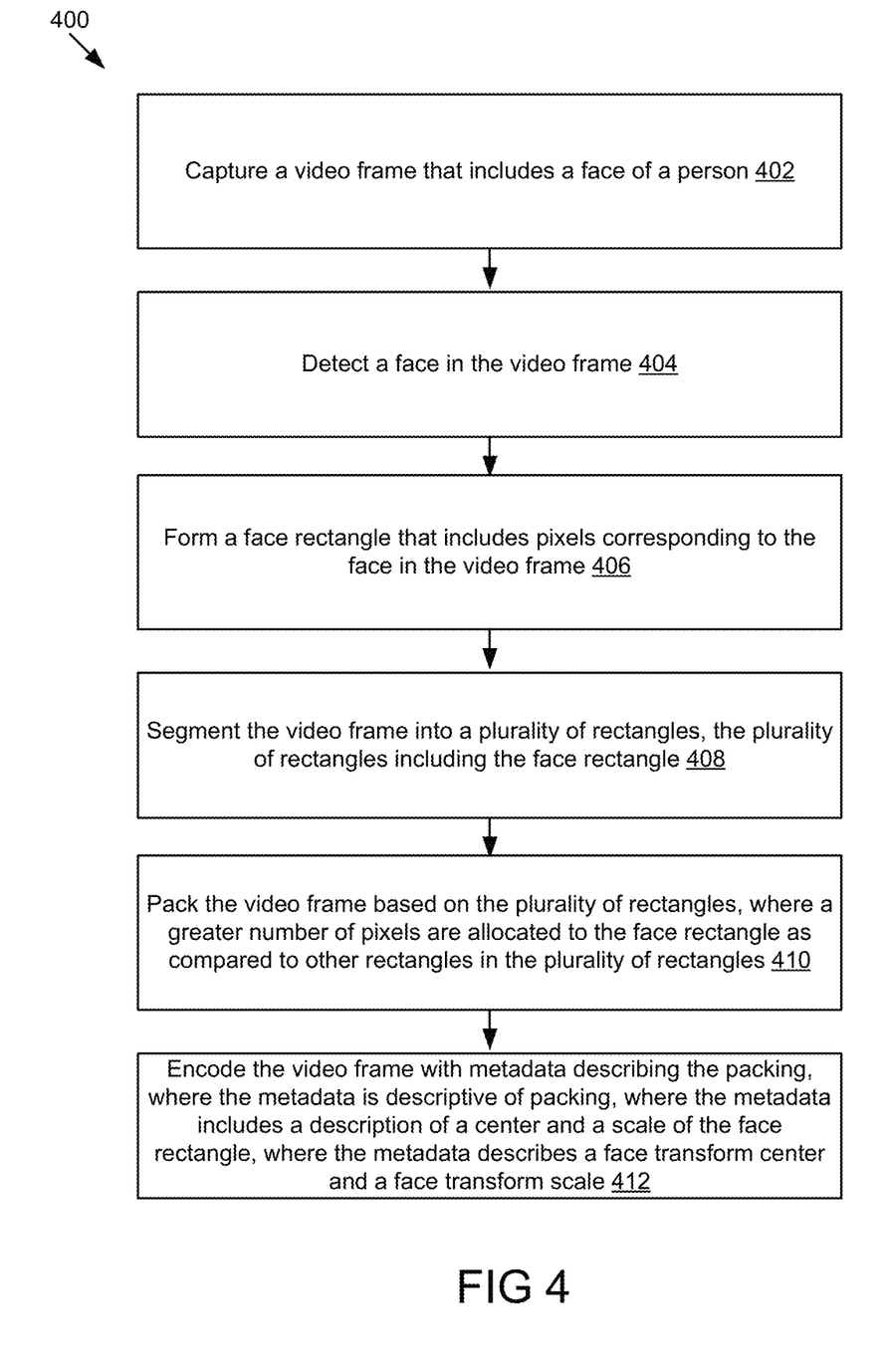
FIG. 4 illustrates a flowchart of an example method to encoded video according to some embodiments.

Figures FIG. 4 illustrates a flowchart of an example method 400 to encode video. The method 400 is performed by a video application 103 stored on a computing device 200, such as a user device 115, a video server 101, or in part a user device 115 and in part a video server 101.

At block 402, a video frame is captured that includes a face of a person. At block 404, it is determined whether the user consented to use of a face of the user. If the user did not consent to use of the face of the user, the method 400 proceeds to block 406, where information about the face of the user is not used. For example, the video frame may be transmitted as captured (with possible use of encoding and/or compression), without performing packing. If the user did consent to the use of the face of the user, the method 400 proceeds to block 408 where a face is detected in the video frame. At block 410, the video frame is segmented into a plurality of rectangles, where the plurality of rectangles include a face rectangle with pixels corresponding to the face in the video frame. At block 412, the video frame is packed based on the plurality of rectangles, where a greater number of pixels in the packed video frame are allocated to the face rectangle as compared to other rectangles of the plurality of rectangles. At block 414, the video frame is encoded, where the encoded video includes metadata descriptive of the packing, where the metadata includes a description of a center and a scale of the face rectangle, where the metadata describes a face transform center and a face transform scale.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method to encode video, the method comprising:
receiving a request to start a video call from a first user;
capturing a video frame that includes a face of a person;
detecting the face in the video frame;
segmenting the video frame into a plurality of rectangles, the plurality of rectangles including a face rectangle with pixels corresponding to the face;
packing the video frame based on the plurality of rectangles, wherein a greater number of pixels in the packed video frame are allocated to the face rectangle as compared to other rectangles of the plurality of rectangles;
encoding the packed video frame, wherein the encoded video frame includes metadata descriptive of the packing that is used during unpacking to rearrange the plurality of rectangles, wherein the metadata includes a face transform center that describes a location of a center of the face of the person in the video frame and a size of the face rectangle before packing; and
responsive to encoding the packed video frame, transmitting the encoded video frame to a device associated with a second user.

2. The method of claim 1, wherein the metadata further includes a description of a location and rotation of one or more of the plurality of rectangles within the encoded video frame.

3. The method of claim 1, further comprising:
transmitting a video stream to the device associated with the second user, wherein the encoded video is part of the video stream.

4. The method of claim 1, further comprising:
after packing for the video frame, adding padding pixels around each of the plurality of rectangles.

5. The method of claim 1, wherein packing the video frame includes using the video frame as a source texture.

6. The method of claim 1, wherein the plurality of rectangles further includes at least one rectangle selected from a left-of-face rectangle, a right-of-face rectangle, an above-face rectangle, a below-face rectangle, and combinations thereof.

7. The method of claim 1, further comprising:
reading the metadata to perform inverse packing to display the plurality of rectangles in corresponding positions on a display screen; and
wherein the corresponding positions include at least one of a left-of-face position, a right-of-face position, an above-face position, or a below-face position.

8. The method of claim 1, wherein the video frame is a first video frame and the method further comprises:
capturing a second video frame that is subsequent to the first video frame; and
responsive to an amount of movement within the second video frame meeting a threshold amount of movement, performing face detection, packing, and encoding of the second video frame.

9. The method of claim 1, wherein detecting the face comprises performing red green blue (RGB) face tracking on the video frame.

10. The method of claim 1, wherein the video frame is a first video frame and the method further comprises:
segmenting a subsequent frame that includes the face of the person;
generating a subsequent plurality of rectangles;
packing the subsequent frame based on the subsequent plurality of rectangles; and
encoding the subsequent frame with the metadata describing the packing.

11. A non-transitory computer-readable medium with instructions stored thereon that, when executed by one or more computers, cause the one or more computers to perform operations, the operations comprising:
receiving a request to start a video call from a first user;
capturing a video frame that includes a face of a person;
detecting the face in the video frame;
segmenting the video frame into a plurality of rectangles, the plurality of rectangles including a face rectangle with pixels corresponding to the face;
packing the video frame based on the plurality of rectangles, wherein a greater number of pixels in the packed video frame are allocated to the face rectangle as compared to other rectangles of the plurality of rectangles;
encoding the packed video frame, wherein the encoded video frame includes metadata descriptive of the packing that is used during unpacking to rearrange the plurality of rectangles, wherein the metadata includes a face transform center that describes a location of a center of the face of the person in the video frame and a size of the face rectangle before packing; and
responsive to encoding the packed video frame, transmitting the encoded video frame to a device associated with a second user.

12. The computer-readable medium of claim 11, wherein the metadata further includes a description of a location and rotation of one or more of the plurality of rectangles within the encoded video frame.

13. The computer-readable medium of claim 11, wherein the operations further include
transmitting a video stream to the device associated with the second user, wherein the encoded video is part of the video stream.

14. The computer-readable medium of claim 11, wherein the operations further comprise:
after packing for the video frame, adding padding pixels around each of the plurality of rectangles.

15. The computer-readable medium of claim 11, wherein the plurality of rectangles further includes at least one rectangle selected from a left-of-face rectangle, a right-of-face rectangle, an above-face rectangle, a below-face rectangle, and combinations thereof.

16. A system comprising:
one or more processors; and
a memory that stores instructions that, when executed by the one or more processors cause the one or more processors to perform operations comprising:
receiving a request to start a video call from a first user;
capturing a video frame that includes a face of a person;
detecting the face in the video frame;
segmenting the video frame into a plurality of rectangles, the plurality of rectangles including a face rectangle with pixels corresponding to the face;
packing the video frame based on the plurality of rectangles, wherein a greater number of pixels in the packed video frame are allocated to the face rectangle as compared to other rectangles of the plurality of rectangles;
encoding the packed video frame, wherein the encoded video frame includes metadata descriptive of the packing that is used during unpacking to rearrange the plurality of rectangles, wherein the metadata includes a face transform center that describes a location of a center of the face of the person in the video frame and a size of the face rectangle before packing; and
responsive to encoding the packed video frame, transmitting the encoded video frame to a device associated with a second user.

17. The system of claim 16, wherein the metadata further includes a description of a location and rotation of one or more of the plurality of rectangles within the encoded video frame.

18. The system of claim 16, wherein the operations further include
transmitting a video stream to the device associated with the second user, wherein the encoded video is part of the video stream.

19. The system of claim 16, wherein the operations further comprise:
after packing for the video frame, adding padding pixels around each of the plurality of rectangles.

20. The system of claim 16, wherein the plurality of rectangles further includes at least one rectangle selected from a left-of-face rectangle, a right-of-face rectangle, an above-face rectangle, a below-face rectangle, and combinations thereof.

* * * * *